C. C. FAIRLAMB.
Milk-Pan Cover.

No. 208,900.　　　　　Patented Oct. 15, 1878.

Attest:
Geo. T. Smallwood Jr
Walter Allen

Inventor
Charles C. Fairlamb.
By Knight Bros
Attys

UNITED STATES PATENT OFFICE.

CHARLES C. FAIRLAMB, OF ARENA, WISCONSIN.

IMPROVEMENT IN MILK-PAN COVERS.

Specification forming part of Letters Patent No. 208,900, dated October 15, 1878; application filed April 22, 1878.

*To all whom it may concern:*

Be it known that I, CHARLES C. FAIRLAMB, of Arena, in the county of Iowa and State of Wisconsin, have invented a new and useful Improvement in Milk-Pan Covers, of which the following is a specification:

The subject of my invention is a milk-pan cover rendered air-tight by a simple and cheap expedient, causing no difficulty in the application or removal of the cover, or in keeping it clean.

Figure 1:
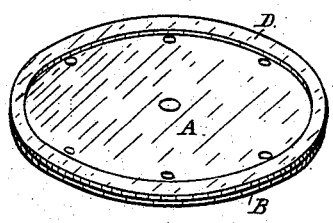
Figure 2:
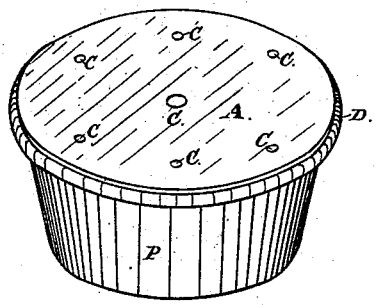
Figure 3:
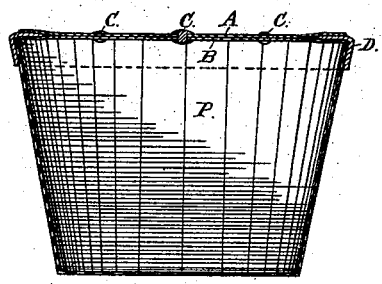
Figure 4:
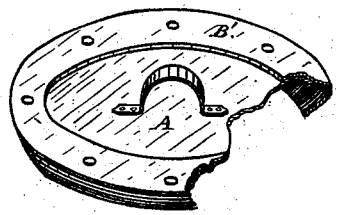

In the accompanying drawings, Figure 1 is a perspective view of my improved cover. Fig. 2 is a perspective view, showing the improved cover applied to an ordinary milk-pan. Fig. 3 is vertical section of the pan and cover. Fig. 4 is a sectional perspective view, illustrating a modification.

My improved milk-pan cover may be made of tin, wood, or paper, or other material, in two disks, A B, secured together by rivets C, with a ring or band, D, of india-rubber, fastened between the edges, so as to extend beyond and lap around the periphery, as illustrated in Fig. 1; or, if preferred, the peripheral band of elastic material may be secured by the application of a ring, B', riveted to the disk A, as shown in Fig. 4, instead of using two complete disks.

The cover may be reversible, as illustrated in Figs. 1, 2, and 3, or, if preferred, it may be used but one way up, and provided with a handle, H, as shown in Fig. 4.

The pan P is of ordinary construction, either of tin, earthenware, or glass, and of any depth or shape. The cover, being made of the proper diameter to fit, is placed over the pan with the elastic band turned up, as shown in Fig. 1, and the band being then turned down around the margin the pan is immediately closed air-tight, and the cover secured thereto.

The following are named as advantages and valuable features in my invention:

First. It constitutes an economical, easy, and effective means of excluding air from milk. By keeping the air from milk in pans the quantity of butter obtained is increased from five to ten per cent. as compared with milk set in uncovered pans.

Second. By keeping the air from the milk the quality of the butter is improved from ten to to fifty per cent.

Third. By covering the milk all dirt and vermin are effectually excluded.

Fourth. The cream will rise in less time when the milk is covered than when exposed to the action of the air.

Fifth. By covering the milk all the flavor thereof is retained by the cream, and is thus imparted to the butter.

Sixth. The cream will not become hard on top, and does not sour when not exposed to the action of the air.

Seventh. The milk after skimming is sweet, and is more valuable as feed for stock.

It is well known that milk set in open pans and exposed to the air will become sour before all of the cream contained in it can rise or become separated. This sourness is conveyed to the cream, and from the cream to the butter, and the older the butter the more sour and rancid it becomes, so that not only its original purity and flavor but its keeping quality is greatly impaired.

Butter is valued according to its purity and richness of flavor, and its fine flavor can only be secured by keeping the milk and cream from contact with the air, not only on account of the chemical action referred to, but owing to the readiness with which milk absorbs flavors and odors from foreign matters, such as vegetables, meats, &c.

There is also a heavy loss from evaporation of both milk and cream in setting milk in open pans. My cover is of great utility in that it accomplishes these desirable results by economical, simple, and efficient means.

Having thus described my invention, what I claim as new, and desire to secure by Letters Patent, is—

A milk-pan cover provided with a peripheral band of rubber or like elastic material, secured between the edges of the plates composing the cover, and projecting so as to fit tightly over and around the margin of the pan, as described.

CHAS. C. FAIRLAMB.

Witnesses:
 DANIEL J. DAVIS,
 JOHN W. EDWARDS.